Oct. 31, 1961 L. C. WHITEMAN 3,007,032
UNIVERSAL ARC WELDING TORCH
Filed May 6, 1959 4 Sheets-Sheet 1

INVENTOR.
LYLE C. WHITEMAN
BY Price & Heneveld
ATTORNEYS

INVENTOR.
LYLE C. WHITEMAN
BY Price & Heneveld
ATTORNEYS

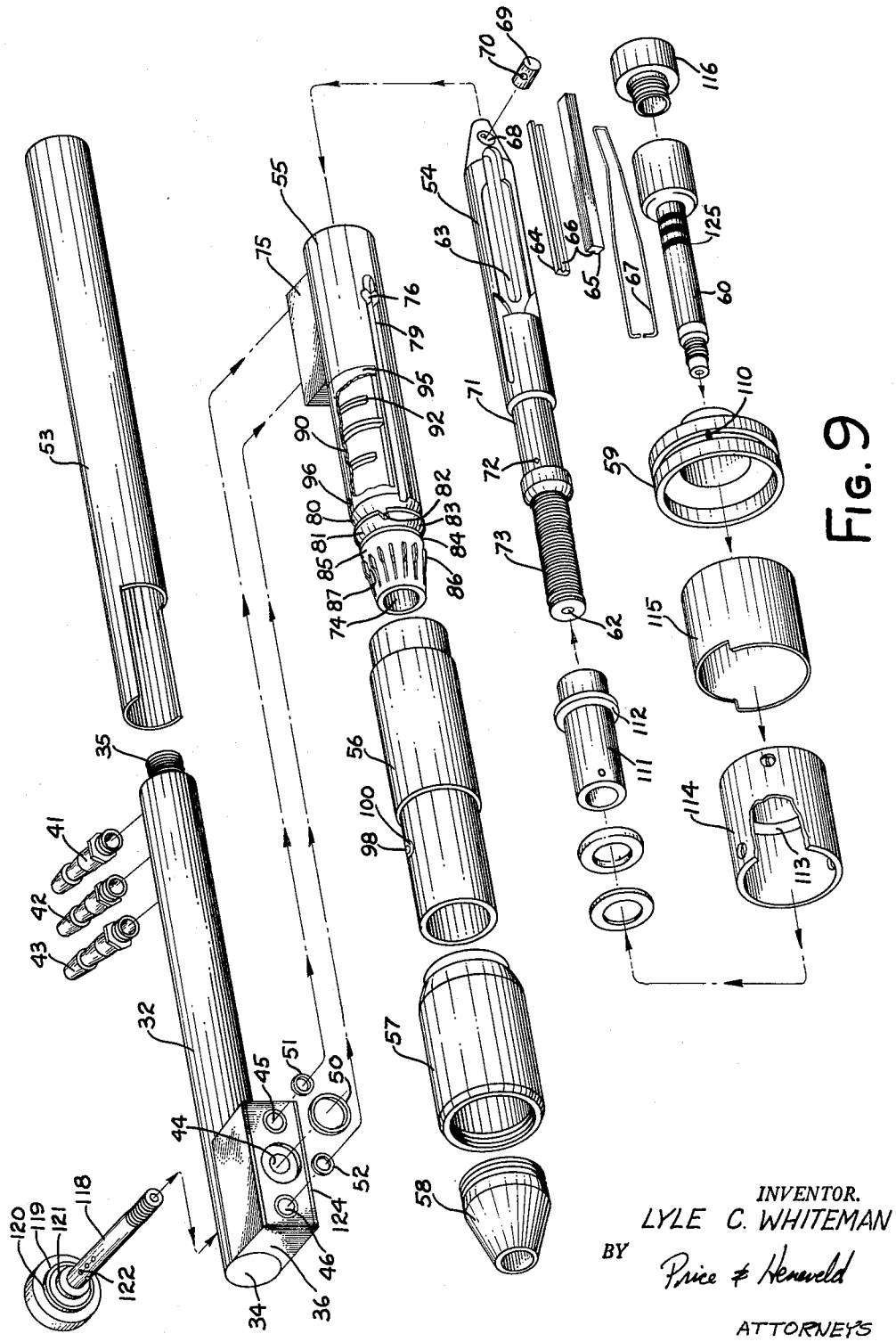

Oct. 31, 1961    L. C. WHITEMAN    3,007,032
UNIVERSAL ARC WELDING TORCH
Filed May 6, 1959    4 Sheets-Sheet 4

INVENTOR
LYLE C. WHITEMAN
BY Price & Heneveld
ATTORNEYS

United States Patent Office

3,007,032
Patented Oct. 31, 1961

3,007,032
UNIVERSAL ARC WELDING TORCH
Lyle C. Whiteman, Fruitport, Mich., assignor to Whiteman Manufacturing Company, a corporation of Michigan
Filed May 6, 1959, Ser. No. 811,323
14 Claims. (Cl. 219—130)

This invention relates to arc welding. More particularly, it relates to a universal arc welding torch.

In the art of arc welding there are three general types of arc welding processes which have been developed.

One general type of process, referred to as the TIG process (tungsten, inert gas process) utilizes a non-consumable, tungsten electrode and, to exclude air from the arc, an inert gas shield around the arc. The gases most commonly used are argon, helium, and mixtures thereof. In this process it is customary to connect the electrode to the negative pole of the electrical current source and to connect the work to the positive pole of said source. Frequently, a consumable filler rod from an external source is introduced into the arc. The weldment is obtained in this process by fusion between the edges of the work and, when the filler rod is employed, by the fusion of the edges of the work and the filler rod. This process is used on nearly all non-ferrous metals and on some ferrous metals in the lighter gauges.

A second process used in arc welding is that referred to as the MIG process (metallic, inert gas process). In this process, a continuous, consumable, wire electrode and an air excluding, oxygen free gas shield for the arc are used. Here, it is customary to connect the electrode to the positive pole of the electrical current source and to connect the work to the negative pole of said source when D.C. current is used. This process is usually applicable in cases where the TIG method is not. Generally, it is applicable in heavier gauge work.

The third general type of arc welding process is the submerged arc process. This process involves a continuous, consumable, wire electrode and, instead of an inert gas shield about the arc, a granular flux pile into which the electrode is driven. The electrical connections are usually the same as in the MIG process. This method is the least expensive of the three and is usually employed in heavy fabrication. It has two disadvantages over the inert gas shield processes. One disadvantage is that the arc is not visible. Another disadvantage resides in handling the flux. Nevertheless, this process is in widespread use.

A more recent development in arc welding processes has been a process in which features of the MIG and submerged arc processes have been combined. A shield gas, for example, carbon dioxide, and a consumable electrode are employed. However, the electrode is provided with a core of flux. This process is intended primarily for welding all plain carbon steels up to 0.35% carbon content.

In each type of arc welding process, there is involved an arc welding torch. The primary function of the torch in each process is to position the arc welding electrode relative to the work to be welded and to connect the electrode to a source of electrical current. In the case of the TIG and MIG methods, another function of the torch is to form the gas shield about the welding arc. In the case of the MIG and submerged arc methods, the torch functions as a guide to the work for the consumable electrode wire from a separate, wire feeding device. In addition to the means for accomplishing these functions, the torches in the TIG and MIG processes usually comprise means for passing a coolant about the tip end region of the torch to remove heat therefrom under normal operative conditions.

The arc welding torch equipment used in these processes, however, has for the most part been single purpose in nature. That is to say, arc welding torches that have been developed have usually been designed and adapted for use according to only one arc welding process and they cannot be used interchangeably to practice the other types of arc welding processes. This is a problem of ever increasing seriousness to the art for the reason that in some industries a single piece of arc welding equipment may be called upon to perform different arc welding processes during each daily operation. Thus, in the aircraft industry, a single arc welding machine may be called upon to perform both the TIG and MIG welding processes sequentially and on differing work. Because of the single purpose nature of such arc welding torch equipment, it is usually necessary under these conditions to retool for each process. This, of course, is a disadvantage because of the down time of the machine and labor costs involved. It is inefficient in the case of automatic arc welding machines because the arc welding torch equipment is not readily attached to and detached from the machine and cannot be quickly adjusted.

That this problem of interchangeability is one of long standing, may be seen from the fact that several attempts have been made in the prior art to solve it. Note, for example, the U.S. Patent, No. 2,754,395, to A. P. Scheller et al. and the U.S. Patent, No. 2,827,549, to G. L. Carlson. The solutions to the problems proposed by these patents are not entirely satisfactory because, in each case, auxiliary equipment in addition to, or in substitution for, original equipment is needed to accomplish a change in operation.

Another general problem in the art of arc welding is that the single purpose torch equipment heretofore developed has not been entirely satisfactory when applied in the specific type of arc welding process for which it is designed.

Thus, in the TIG and MIG type of torches, the inert gas shield forming structures, while operable for such inert gases as helium and argon and mixtures of the same, still leave much to be desired, especially with reference to the volume of gas used to form the shield and the atmosphere insulating effect of the shield. Moreover, such structures have been found to be inadequate when a shield gas such as carbon dioxide is used.

In the TIG type of torches, a collet has been used to hold the tungsten electrode and to transmit electrical current thereto. Here the electrical contact is a spot-type contact. This leads to high resistance, low current efficiency and low service life of the tungsten electrode.

Still another problem of TIG type torches is the difficulty involved in adjusting the distance between the electrode and the work under operative conditions. Often, the electrode will change shape and correction must be made during operation in order to obtain the desired weldment. Heretofore, it has been necessary to adjust the position of the entire torch body in order to adjust the electrode position. This usually requires the adjustment also of the filler rod feeder which is usually attached to the torch body. In either case, minor adjustment of the electrode cannot generally be accomplished in the prior art TIG type of torches.

In the MIG type torches, there is provided a tubular guide through which the electrode wire is passed. Whenever there is a change in the diameter of electrode wire to be used, it heretofore has been necessary to change the tubular guide. Moreover, if the wire electrode entering the torch is kinked, it is not unusual for the wire to hang up in the tubular guide. In addition, tubular guides make poor and varying electrical contact with the electrode.

Electrical contact of the electrode with the tubular guide depends on actual physical contact between the electrode and the tubular guide. In the submerged arc and MIG type torches heretofore used the greatest and most efficient contact may be at times at the top of the tubular guide, at other times at the middle of the guide and at other times at the bottom of the guide. Because the wire electrode does offer electrical resistance to the passage of electrical current therethrough, and because dissipation of current in overcoming the resistance is in the form of heat, there is a tendency for the wire to preheat between the point of most efficient electrical contact and the arc. The warmer the wire the less current is needed to burn it off and the less penetration of the weld into the work. Consequently, when the most efficient electrical contact is at the top or middle or at any position other than at the bottom of the tubular guide, there is a tendency for the burn-off rate of the electrode at the arc to be greater than when the most efficient contact occurs at the bottom of the tubular guide. In turn there is a tendency for the penetration of the weld into the work to be decreased, there is a tendency to effect less melting of the parent metal of the work, and there is a tendency for more build-up of electrode deposit on the work.

Hence, with the poor and varying electrical contact inherent in the tubular guide-wire electrode combination, the weldment obtained in using the prior art MIG and submerged arc torches tends to vary and is difficult to control.

At this point it should be noted that in hard-facing operations, it is desired to have low penetration of the weld and a high build-up of electrode deposit. In other operations the opposite is true. Hence, in changing from one operation to another, it is necessary to adjust the distance between the arc and the point of electrical contact with the electrode in order to achieve the desired weldment conditions. In the case of the prior art MIG and submerged arc torches such adjustment can only be made by moving the entire torch body. This is time consuming and inefficient. In addition, accuracy of adjustment is most difficult to obtain.

Another problem common to all three types of single purpose arc welding torch equipment is the difficulty in mounting the torches on, and dismounting the torches from, automatic welding machines. An additional problem is the difficulty in dismantling the removed torches for service and repair work.

A general object of this invention is to provide an arc welding torch which can be employed to perform all arc welding processes. More particularly, it is an object of this invention to provide an arc welding torch that can be used in all arc welding processes without the necessity of adapting the same with auxiliary equipment or different parts.

A specific object of this invention is to provide an automatic arc welding torch assembly which can readily and rapidly be mounted to, and dismounted from, an automatic arc welding machine. Another specific object of this invention is to provide a torch assembly which can be readily and rapidly disassembled for service and repair, and which can readily and rapidly be assembled for use.

Another specific object of this invention is to provide an arc welding torch with means for establishing and maintaining a highly efficient, low resistance, electrical contact with the electrode. A most important object of this invention is to provide an arc welding torch with means for establishing and maintaining constant electrical contact with said electrode at a desired and known position in the torch body.

Still another specific object of this invention is to provide an arc welding torch with means for adjusting under normal operative conditions the arc length of tungsten electrodes in TIG operation without movement of the over-all torch body. At the same time another specific object is to provide an arc welding torch with means for adjusting under normal operative conditions in MIG and submerged arc process operations without movement of the entire torch body the location of constant electrical contact with the consumable wire electrode and thus the distance between the arc and the location of electrical contact.

Still another object of this invention is to provide electrode contacting means within an arc welding torch which can accommodate a wide range of electrode diameters.

Another important object of this invention is to provide an arc welding torch, especially suitable for the TIG and MIG types of welding operation, which has an inert gas shield forming structure of greater efficiency and which can adequately handle such inert shield gases as carbon dioxide.

These and other objects which may appear as this specification proceeds are achieved by this invention which shall be described with reference to the drawings which form a material part of this disclosure. A brief description of the drawings is as follows.

Figures 1, 2, 3:
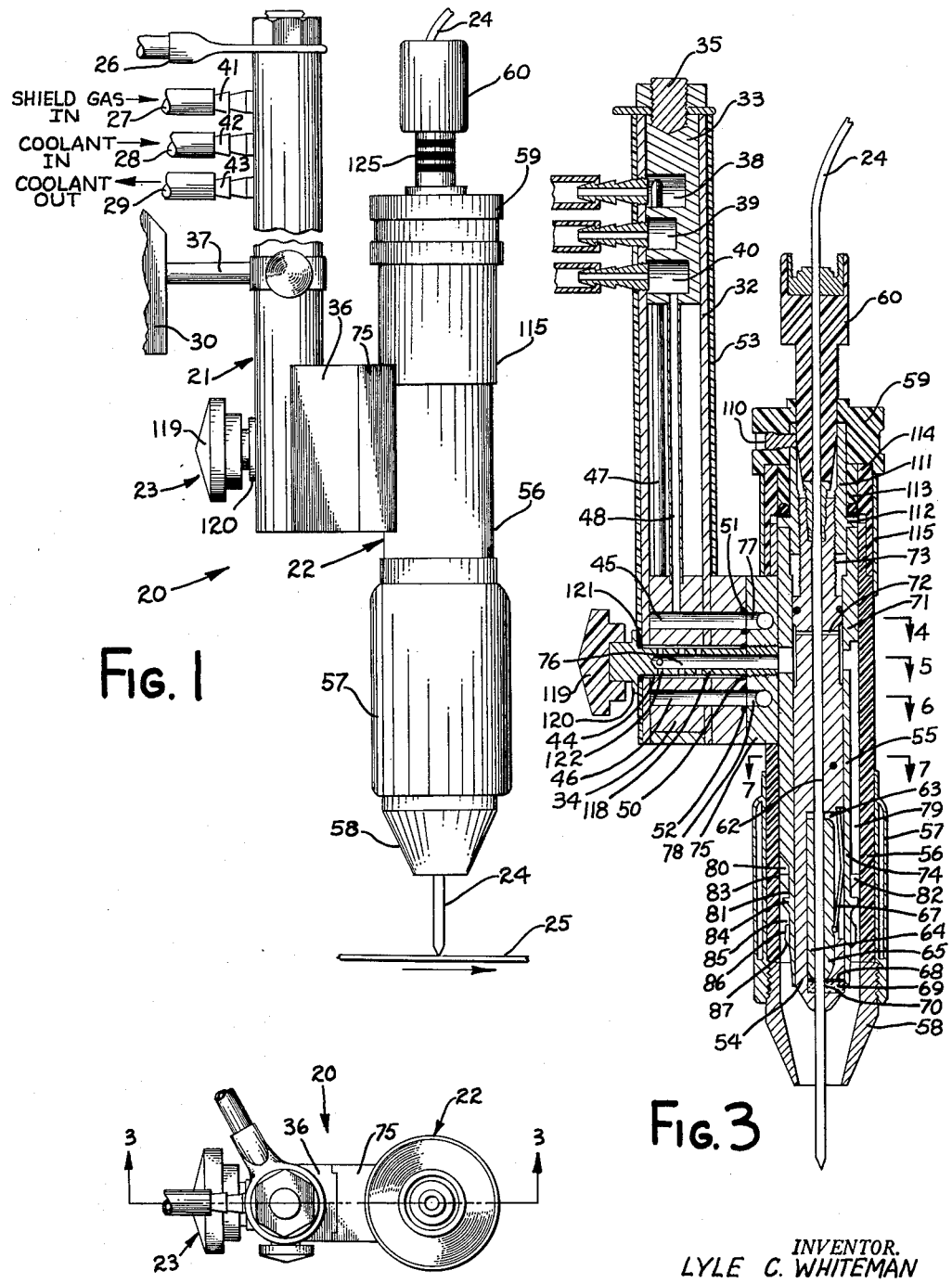
FIG. 1 is a side view of a preferred embodiment of the automatic arc welding torch of this invention.
FIG. 2 is a plan view of the arc welding torch of FIG. 1.
FIG. 3 is a sectional view of the arc welding torch of FIG. 1, which view is taken along the line 3—3 of FIG. 2.

FIG. 9 is an exploded view of the arc welding torch of FIGS. 1 and 2, which view shows the outer barrel member 55 of the torch body assembly with the outer structure partially cut away to reveal internal structure, and which view shows the outer casing member 114 of the torch body assembly partially cut away to reveal internal structure.

Figure 10:
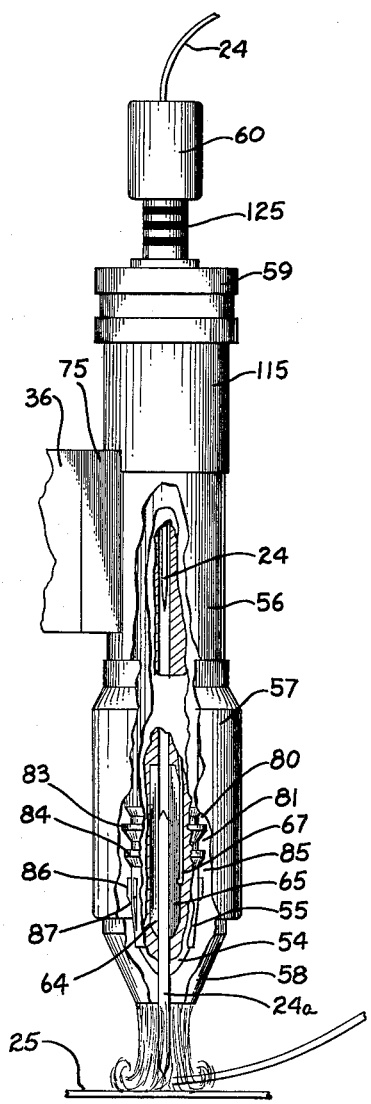

FIG. 10 is a side view of the torch body assembly of FIG. 1 with central portions of the assembly cut away to reveal internal structure, which view shows the torch body set up for TIG type operation.

Figure 11:
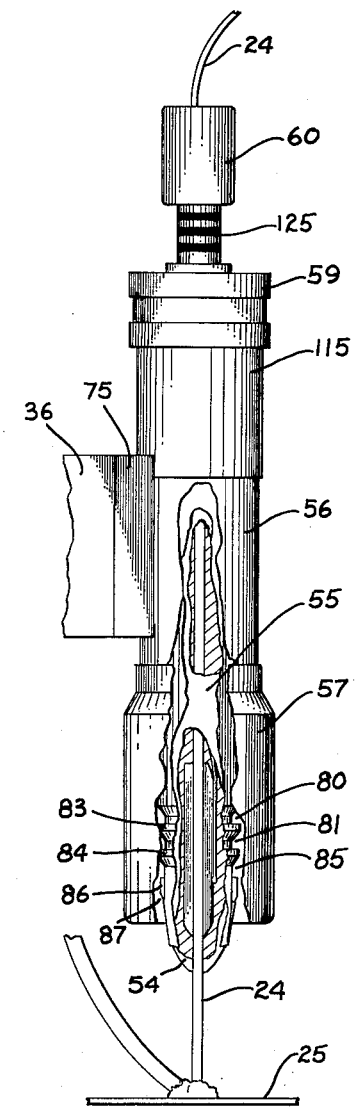

FIG. 11 is a side view of the torch body assembly of FIG. 1 with the gas cup member 58 removed and with central portions thereof cut away to reveal internal structure, which torch body assembly is set up for submerged arc operation.

Figure 12:
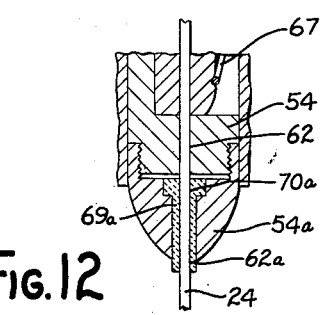

FIG. 12 is a side, sectional view of the tip end region of the inner barrel member of the torch body assembly, which view illustrates another preferred embodiment of said end region.

The drawings broadly disclose a universal arc welding torch which comprises a service and mounting fixture assembly, a torch body assembly and means for attaching and detaching said torch body assembly to said service and mounting fixture assembly. Electrical current, shield gas and coolant service to the torch body assembly from the service and mounting fixture is provided by means of lateral mountings of the fixture assembly and torch body assembly having exposed and abutting electrically conductive faces with corresponding openings for inert gas and coolant delivery and discharge.

The drawings broadly disclosed a torch body assembly comprising an inner barrel for the electrode, wherein electrical contact with the electrode is established and maintained over a large area of the electrode by a laterally movable shoe member under inwardly directed spring bias.

Moreover, the drawings disclose means for adjusting parallel to the axis of the inner barrel the position of electrical contact with the electrode without the necessity of adjusting the position of the entire torch body assembly.

The drawings further broadly disclose a torch body assembly with structure adapted to form an optimum gas shield from the torch body assembly to the work with not only the usual inert gases such as helium and argon but also with such gases as carbon dioxide. A feature of the gas shield forming structure is the provision of means for releasing gas at uniform flow rates at a plurality of points about the electrode at the tip end of the torch body assembly and for merging the released gas into a uniform peripheral shield without turbulence.

Structure

Considering the drawings in detail, there is shown in FIG. 1 a universal arc welding torch 20 mounted on a carriage 30 of an automatic welding machine. This torch comprises a bracket or service and mounting fixture assembly 21 and a torch body assembly 22 mounted thereon. Attachment means 23 are provided to attach and detach the torch body assembly 22 from the service and mounting fixture 21. As shown in FIGS. 1 and 2, the universal arc welding torch 20 contains a consumable wire electrode 24 which passes through the torch body assembly 22 to the work 25. By movement of the work 25 or of the automatic welding machine carriage structure 30, there is relative movement between the work 25 and the tip of the consumable wire electrode 24. Electrical current is brought to the universal arc welding torch by means of a flexible cable 26. Inert gas is brought to the torch 20 by means of an inert gas hose 27. The torch assembly is supplied with a coolant which is delivered via hose 28 and discharged via hose 29.

The service and mounting fixture assembly 21 or bracket comprises a generally metallic, electric current conducting, tubular member 32, the longitudinal axis of which will most usually be in a vertical position. The tubular member 32 comprises a metallic plug 33 at the normally top end thereof and a metallic plug 34 at the normally bottom end thereof. At the normally bottom end thereof, there is provided a metallic, electrically conductive, lateral mounting block 36. The top plug 33 comprises a coaxial socket in which there is threadedly engaged a binding post 35 for terminal of the flexible electric cable 26. Laterally, the top plug 33 has three transverse bores, 38, 39 and 40 perpendicularly disposed to the axis of the tubular member 32 and preferably in the same plane. Threadedly engaged with said bores are nozzles 41, 42 and 43. Connected to the nozzle 41 is the shield gas supply hose 27. Connected to the nozzle 42 is the coolant delivery hose 28, while connected to the nozzle 43 is the coolant discharge hose 29.

The bottom plug 34 in combination with the lateral mounting block 36 comprises three transverse bores 44, 45 and 46 perpendicularly disposed to the axis of the tubular member 32 and preferably in the same plane. The central bore 44, by means of longitudinal passageways formed in the plugs 33 and 34 and by conduit 47, is in communication with the shield gas bore 38. The other two bores 45 and 46, by means of longitudinal passageways formed in the top and bottom plugs 33 and 34 and by means of a conduit (not shown) and a conduit 48, are in communication with the coolant bores 39 and 40. In FIGS. 3 and 9, it will be observed that on the exposed face of the lateral mounting block 36 the bores 44, 45 and 46 are recesses. Seated in the recesses (FIG. 3) are O-sealing rings 50, 51 and 52.

The tubular member 32 is preferably surrounded by an insulator casing 53. Midway of the ends of the tubular member, there is preferably provided an attachment member 37 for attaching the service and mounting fixture assembly 21 to the carriage superstructure of an automatic welding machine 30.

The torch body assembly 22 (see FIGS. 9 and 1) comprises a metallic inner barrel member 54, a metallic outer barrel member 55, an insulator casing member 56, a coolant jacket member 57 at the tip end region of the torch body assembly, a gas cup member 58 at the tip end of the assembly, and, at the normally top end of the torch body assembly, an arc length adjustment member 59 and a consumable electrode adapter member 60.

The metallic, electrically conductive, inner barrel member 54 (FIG. 3) has a central passageway 62 extending from one end to the other thereof along the axis thereof. At the tip end region of the inner barrel member 54 there is provided (see FIG. 9) a longitudinal slot 63 which extends transversely from the side of the inner barrel to at least the central passageway 62 and preferably beyond the central passageway 62. Disposed within the slot are a pair of metallic guide shoes 64 and 65. The innermost shoe is preferably seated freely in the slot 63 in the inner barrel member 55. The function of the guide shoes is to contact the electrode within the central passageway 62 and to convey electrical current thereto. As best shown in FIG. 9, in their preferred form the shoes 64 and 65 are provided with a longitudinal groove 66 in which the electrode is positioned. A spring clip member 67, seated within recessed portions surrounding said slot 63, is provided to furnish a spring bias urging the outermost shoe 65 against the innermost shoe 64.

The inner barrel member 54 (see FIGS. 3 and 9) also comprises between the slot 63 and the tip end thereof a transverse hole 68, the axis of which intersects the longitudinal axis of the inner barrel 54. Disposed within the hole 68, when the torch is set up for MIG and submerged arc operations, is a protective insert 69. The insert is composed of a material which is electrically non-conductive and which is non-adherent to the electrode on fusion thereof. Ceramic and heat resistant fibrous materials have been found to be satisfactory. The insert 69 has a passageway 70 therethrough adapted to be in alignment with the central passageway 62. The diameter of the passageway 70 is slightly larger than that of the electrode 24 so that the insert 69 will provide travel clearance to the electrode. While the insert is shown as cylindrical, it can be of any practical shape. The function of the insert is to prevent fusion of the electrode 24 to the guide shoes 64 and 65 and to the inner barrel member 54 when the torch is used for MIG and submerged arc operation. It performs this function by extinguishing the arc before it can reach these members.

Another protective construction is shown in FIG. 12. In this embodiment there is provided a protective insert 69a which is a tubular member of ceramic or fiber material of greater dimension longitudinally of its passageway 70a than the type shown in FIGS. 3 and 9. In this embodiment, the tip end region of the inner barrel member comprises a hollow tip member 54a with a coaxial opening 62a for the electrode 24. The tip member 54a threadedly engages the end of the inner barrel member 54a and functions to retain the insert 69 in place.

Although not shown it is preferred that the outside of the tip end region of the inner barrel member 54 and 54a be clad with a chromium plating. In such manner adherence of spatter from the arc to the inner barrel is minimized.

Intermediate the ends of the inner barrel 54 there is provided an annular recess 71, the purpose of which is to provide an annular gas channel around the inner barrel 54. Within the area of the annular recess 71, there is preferably provided a transverse, constricted, gas orifice 72 (see FIG. 3) which is in communication with the central passageway 62. The purpose of this transverse gas orifice is to provide a positive gas pressure in the central passageway 62. By so doing, air is prevented from entering the central passageway 62 with the wire electrode 24 at the top end of the torch body assembly 22 and from passing therethrough into the weld area.

The normally top end portion of the inner barrel 54 is provided with thread means 73 for use in adjusting the relative position of the inner barrel 54 to the work 25.

Figure 5:
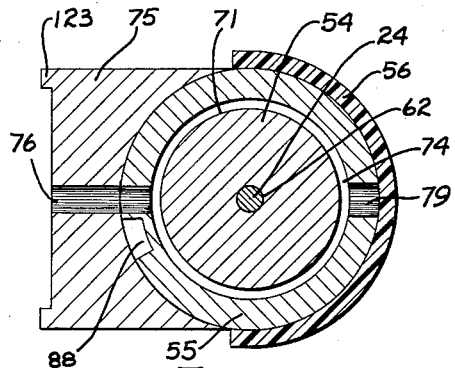
FIG. 5 is another enlarged, cross sectional view of the torch body assembly of FIG. 1, taken along the cutting plane 5 of FIG. 3.

The outer barrel member 55 (see FIGS. 9 and 3) comprises a central passageway 74 for the inner barrel member 54. The inside diameter of the passageway 74 and the maximum outside diameter of the inner barrel 54 are such as to provide a friction fit or sliding contact between portions of the inner barrel member 54 and the central passageway 74 of the outer barrel member 55. The outer barrel member 55 is a metallic, electrically conductive member and functions to transmit electrical current to the inner barrel member 54. Fastened to the outside of the outer barrel member 55, there is provided a metallic, electrically conductive, lateral support block 75 which is located near the normally top end of the outer barrel means 55. The lateral support block 75 has a face matching the face of the lateral mounting block 36. The lateral support block 75 while shown as a separate piece of the outer barrel member 55 is permanently fastened thereto. It may actually be integral therewith. The block 75 comprises an inert gas receiving bore 76 and coolant bores 77 and 78. The openings of said bores coincide in position and shape with the openings of the corresponding bores 44, 45 and 46 (see FIG. 3) in the lateral mounting block 36 of the service and mounting fixture assembly 21. The inert gas bore 76 extends into the inner passageway 74 and through the other side wall of the outer barrel member 55 (see FIGS. 9, 3 and 5). On the outside of said other side wall there is provided a longitudinal, axially aligned, gas channel 79 which extends from the outlet of said inert gas bore 76 to the tip end region of the outer barrel member 55.

At the tip end region of the outer barrel member 55, there is provided a gas shield forming structure. This structure (see FIGS. 3 and 9) comprises an annular recess 80 into which the gas channel 79 opens. Next to the annular recess 80, there is provided another annular recess 81 which is in communication with annular recess 80 by means of longitudinal channels 82 (FIG. 9) through an annular partition wall 83. The annular partition wall 83 has an outside diameter corresponding to the maximum outside diameter of the outer barrel member 55. On the other side of the annular recess 81 there is provided an annular baffle 84. The annular baffle 84 has an outside diameter slightly less than the maximum outside diameter of the outer barrel 55 and of the annular partition 83. A third annular recess 85 is provided for receiving shield gas flowing around the annular baffle 84. Between the annular recess 85 and the tip end of the outer barrel 55, there are provided a plurality of radially extending, longitudinally aligned, straightening fins 86 between which are a plurality of longitudinally aligned gas flow passages 87.

Figure 4:
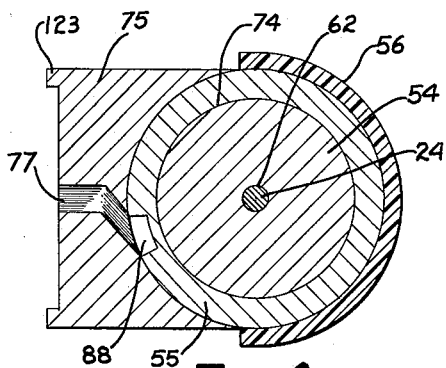
FIG. 4 is an enlarged, cross sectional view of the torch body assembly, taken along the cutting plane 4 of FIG. 3.
Figure 6:
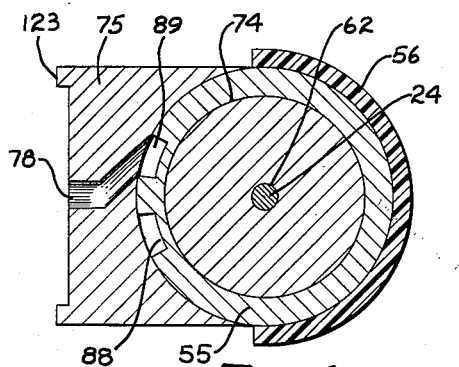
FIG. 6 is an enlarged, cross sectional view of the torch body assembly, taken along the cutting plane 6 of FIG. 3.
Figure 7:
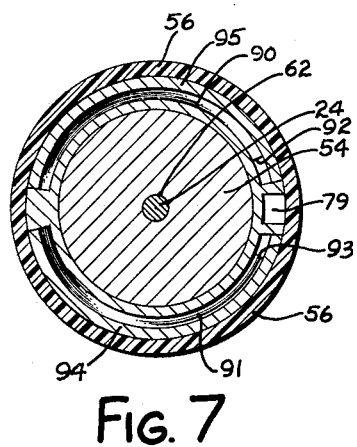
FIG. 7 is an enlarged, cross sectional view of the torch body assembly, taken along the cutting plane 7—7 of FIG. 3.

The coolant bores 77 and 78 (see FIG. 3) in the lateral support block 75 open into channels 88 and 89 (see FIGS. 4 and 6). These channels are longitudinally disposed in the outer surface of the outer barrel 55 underneath the lateral support block 75. The channels 88 and 89 open into a pair of lateral coolant jackets 90 and 91 disposed on each side of the outer barrel member 55 between the lateral support block 75 and the inert gas shield forming structure at the tip end of the outer barrel member 55 (see FIGS. 7 and 9). Each coolant jacket is formed by removing semi-annular portions of each side of the outer barrel member 55, leaving, however, semi-annular staggered, transverse baffle ridges 92 and 93 (see FIG. 9) and longitudinal partition walls (see FIG. 7). In one of the partition walls is disposed the longitudinal gas channel 79. Overlying the baffle ridges 92 and 93 and covering the removed portions on one side of the outer barrel member 55 is a semi-annular shell 94 and on the other side a semi-annular shell 95 (see FIGS. 9 and 7). The outside of both shells 94 and 95 is at the maximum outside diameter of the outer barrel member 55. At the tip end region of each shell 94 and 95 and adjacent one of the longitudinal partition walls separating the coolant jacket chambers is an opening 96 (see FIG. 9). This opening 96 in the case of coolant jacket 91 functions to pass coolant from the coolant jacket 91 to the coolant jacket member 57. In the case of coolant jacket 90 this opening functions to pass coolant from the coolant jacket member 57 to the coolant jacket 90.

The insulator casing member 56 surrounds the outer barrel member 55. The insulator casing member has an inside diameter substantially that of the outside diameter of the outer barrel member 55 whereby there is a press fit between the insulator casing member 56 and the outer barrel member 55 (see FIG. 3). The insulator casing 56 cooperates with the gas channel 79 to form a confined shield gas delivery passageway. It cooperates with the annular wall surrounding the annular recess 80 whereby the annular recess 80 and casing form a gas distributing and expansion chamber. It cooperates with the annular partition wall 83 to confine gas passage flow through the longitudinal channels 82 into the annular recess 81. Again, the insulator casing member 56 cooperates with the annular recess 81 to provide another gas distribution chamber and with the annular baffle 84 to form an annular gas discharge orifice which slightly restricts the gas flow so that the gas emerges in uniform volume and density around the entire perimeter of the annular baffle 84. It cooperates with the straightening fins 86 to confine gas discharge from the annular orifice to the gas passages 87 between the straightening fins 86. A longitudinal section of the casing member 56 is open in order to accommodate the lateral support block 75 (see FIGS. 3 and 4). Disposed through the tip end region of the insulator casing member 56 are a pair of openings 98 (see FIG. 9) which coincide with the coolant openings 96. Disposed within and defining each opening 98 is an O-ring 100.

Figure 8:
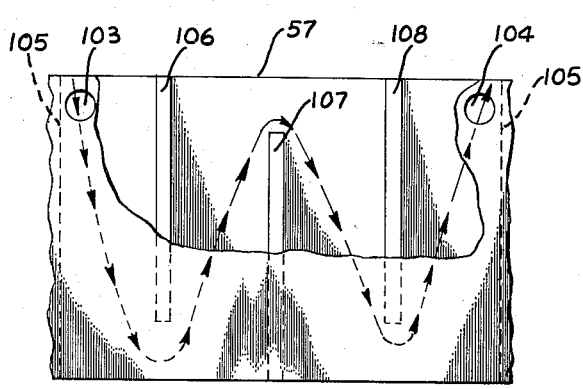
FIG. 8 is a cut-away view of the coolant jacket member at the tip end region of the torch body, which jacket has been removed from the torch body, divided along the dividing wall thereof and laid out in plan view with the inner side up. Coolant flow lines are provided to show circulation of coolant therethrough.

The annular coolant jacket member 57 is mounted as by means of an adhesive on the insulator casing member 56 at the tip end region thereof. The openings to the coolant jacket member are located on the inside diameter thereof. As shown in FIG. 8, these openings are 103 and 104. These openings 103 and 104 are in alignment with the openings 98 of the insulator casing member 56. The coolant jacket member comprises a partition wall 105 longitudinally disposed between the openings 103 and 104. In the annular chamber thus formed, there are provided longitudinal, staggered, baffles 106, 107 and 108 arranged as shown in FIG. 8.

The gas cup member 58 is threadedly mounted on the end of the coolant jacket member 57. The gas cup member 58 is a hollow, inverted, frustum of a cone. It, in combination with the gas shield forming structure of the outer barrel member 55, functions to form the gas shield around the electrode 24.

The electrode adjustment member 59, disposed at the normally top end of the torch body assembly 22, is secured as by means of a setscrew 110 to a rotatable, inner cylinder member 111. The inside diameter of the inner cylinder member 111 is provided with thread means for threadedly engaging the thread means 73 of the inner barrel member 54. On the outside of the inner cylinder member 111, there is provided an annular collar portion 112, the underside of which bears against the end of the outer barrel member 55. On the top side of the collar portion 112 there is provided an annular gasket member and O-sealing ring which bear against a bushing 113 (see FIGS. 9 and 3) fastened as by means of screws to an outer end casing member 114. The outer end casing member 114 is fastened as by means of screws (not shown) to the insulator casing member 56 and outer barrel member 55. In addition, there may also be provided a metallic housing cylinder 115 around the outer end casing 114 and the top end portion of the insulator casing 56.

The torch body assembly 22 will usually comprise also a consumable electrode, guide member 60. The lower ends of the guide member 60 is provided with threads for threadedly engaging a corresponding threaded section of the upper portion of the central passageway 62. The upper end of the guide member 60 is provided with means for engaging the discharge end (not shown) of a consumable wire electrode feeding equipment. When the torch body assembly 22 is used with a non-consumable, tungsten electrode, the end of the guide member 60 may be covered with a cap 116 (FIG. 9). Because the guide member 60 is longitudinally movable with the inner barrel member 55, indicator bands 125 or other indicia may be provided around that portion of the outside of the guide member, which moves longitudinally past the top of the rotatable adjustment member 59.

The torch body assembly 22 is secured to the service and mounting fixture assembly 21 by attachment means 23. Such means comprise a hollow, tubular bolt member 118, one end of which is secured to, and capped by, a turning knob 119. It will be observed that the shield gas bore 44 in the lateral mounting block 36 extends entirely through the lateral mounting block 36, the bottom plug 34 and the tubular member 32. The cylindrical bolt 118 is normally positioned within the shield gas bore 44 and extends into the shield gas bore 76 of the lateral support block 75. The shield gas bore 76 and the corresponding end region of the cylindrical bolt member 118 are provided with threads for engaging the tubular bolt 118 to the lateral support block 75.

The interior of the tubular bolt 118, it will be observed, is hollow and at the threaded end thereof opens into the shield gas bore 76. At the knob end region of the tubular bolt member 118, there are provided a plurality of transverse gas orifices which are positioned in the region of the outlet of the inert gas conduit 47 in the shield gas bore 44 when the tubular bolt 118 is seated therein. To minimize shield gas leakage at the knob end of the tubular bolt member 118, there is provided a collar 120 and an O-ring seal 121 which, when the tubular bolt 118 is seated, bears against the outside surface of the tubular member 32 to form a gas-tight seal. Preferably, this surface is flat in order to provide for a uniform seating of the O-ring seal 121 on the surface.

To facilitate mounting of the torch body assembly 22 to the service and mounting fixture assembly 21 and to obtain maximum current transfer, the lateral support block 75 may be provided with longitudinal guide rims 123 and the lateral mounting block 36 may be provided with longitudinal, recesses 124 for receiving the guide rims 123. The abutting faces of the lateral support block 75 and lateral mounting block 36 thus match and function to convey service from the service and mounting fixture assembly 21 to the torch body assembly 22. The O-rings 50, 51 and 52, compressed between the faces, prevent leakage of shield gas and coolant between the faces under normal operative conditions.

*Operation*

To set up the universal arc welding torch 20 for automatic welding machine MIG type operation, the consumable electrode 24 is inserted through the electrode guide member 60 and into central passageway 62 of the inner barrel member 55 until it emerges at the tip end of the torch body assembly 22. The torch 20 will appear as in FIGS. 1 and 3. The consumable electrode 24, it will be observed, passes between the shoes 64 and 65 and is in contact therewith because of the spring tension on the outer shoe 65. It will also be observed that the electrode 24 passes through the passageway 70 of the protective insert 69. The adjustment member 59 is set at mid-range as indicated by the marking bands 125 on the consumable electrode adapter member 60 shown in FIG. 1.

Electrical current, wire feeding equipment, shield gas and coolant service to the torch 20 are turned on. Optimum welding conditions are then established and maintained by normal procedures (which include adjustment of wire speed, speed of travel of the carriage 30 or work 25 as the case may be, and gas flow). Then, by adjustment of the inner barrel 54 through rotation of the adjustment member 59, the desired degree of weld penetration and deposition of the electrode 24 is obtained.

To set up the universal arc welding torch 20 for TIG operation, the consumable electrode 24 is merely retracted into the central passageway 62 until the tip thereof is at a position above the guide shoes 64 and 65 as shown in FIG. 10. It may also be retracted further so that the tip of the electrode is within the electrode guide member 60 or even entirely out of the torch body assembly 22. The protective insert 69 or 69a may be removed, especially if the passageway 70 therein has an insufficient diameter to accommodate the tungsten electrode. This can be done by rotating the adjustment member 59 until the tip of the inner barrel member 55 has moved completely out of the confines of the outer barrel member 56 and gas cup member 58. The tungsten electrode 24a is then inserted into the central passageway 62 as from the tip end of the inner barrel member 54 and pushed into the grooves 66 of the shoes 64 and 65. Because of the spring clip 67, the outer shoe 65 will give way laterally just sufficiently to allow the electrode to enter between the shoes 64 and 65. Thus, the shoes will accommodate any diameter of electrode, consumable and non-consumable, that can be disposed in the central passageway 62 of the inner barrel member 54. The spring tension of the clip 67, however, is more than sufficient to hold the tungsten electrode 24a in position. Service to the torch body assembly 22 is then turned on and arc length adjustment made by rotation of the adjustment member 59.

To set up the universal arc welding torch 20 for submerged arc operation, the gas cup member 58 is removed from the coolant jacket member 57 and the consumable electrode 24 driven down into the pile of granular flux (see FIG. 11). The inner barrel member 54 is adjusted to mid-range by manual rotation of adjustment member 59 and electrical service to the torch 20 turned on. Control of the weld characteristics is achieved in the same fashion as described in conjunction with MIG operation. Although the arc is not visible because of the flux pile, by relying on the indicator bands 125 around the outside of the consumable electrode adapter member 60 in rotating the adjustment member 59, the adjustment of the burn-off rate of the consumable electrode 24 in submerged arc operation may be accomplished with a high degree of accuracy.

Thus, there is provided a universal arc welding torch which is especially suitable for high production machine equipment. The welding torch head or body assembly can be quickly removed and replaced, merely by unscrewing the tubular bolt 118. The welding torch head assembly can be readily mounted to a suitable pistol type grip. The type of welding operation can be changed without changing the torch body assembly. The torch body assembly 22 can accommodate a large variety of electrode diameters without change in contact efficiency. Because of the means for contacting the electrode and conducting electrical current thereto, the central passageway can have an oversize diameter and thereby accommodate consumable electrodes with kinks and the like.

Another feature of advantage of the universal arc welding torch of this invention is the gas shield formed thereby. Gas shields so formed, regardless of whether the gas be argon or helium or be carbon dioxide, are circumferentially consistent and of uniform gas density, thus resulting in less weld spatter. Moreover, shield gas flow rates can generally be reduced to flow rates lower than those generally used in prior art equipment. As an example, in one instance where an arc welding torch of this invention replaced a prior art torch, it was possible to reduce the $CO_2$ shield gas requirement from 40 c.f.h., that of the prior art torch, to 20 c.f.h.

Still another feature of advantage of this invention is the contact efficiency. In MIG and submerged arc operations the contact efficiency of the torch of this invention is so high that substantially no preheating of the electrode occurs prior to the electrode leaving the torch because substantially all of the electrical current conducted by the electrode to the arc is removed therefrom at the bottommost part of the electrode guide shoes 64 and 65. As a result, better penetration of the weld into the work and less build-up of wire deposit on the work can be obtained. Current to the electrode is, by reason of efficient electrical contact, increased, which allows a lower rate of electrode consumption. In TIG operation the service life of the tungsten electrode is increased. Indeed under actual operative conditions the grind marks of the electrode were found still to be present after a couple of feet of welding had been done therewith.

Another advantage of this invention is that as the guide shoes 64 and 65 become worn, they can be readily and easily replaced without wasting or rebuilding the entire inner barrel.

Another feature of advantage of the invention, especially in conjunction with MIG type operation, is that it has been found almost impossible to weld the consumable electrode wire to the inner barrel when the protective inserts 69 and 69a are in place.

Another feature of advantage of this invention is the vertical adjustment aspect thereof. In TIG operation the electrode can be vertically adjusted without moving the torch body and without having to adjust the filler rod equipment. In MIG and submerged arc type operations the length of electrode between the work and the location of electrical current contact can be accurately adjusted without moving the torch body.

Still another feature of advantage of this invention is that in automatic welding machines it is no longer necessary to use a water cooled electric service cable to the torch in view of the service and fixture assembly 21.

Other features and advantages will be apparent to those in the exercise of ordinary skill in the art upon reading the foregoing description. Moreover, this invention may be embodied in several forms without departing from the spirit or essential characteristics thereof. Thus, the service and mounting fixture assembly may be in the form of a hand grip for manual operations. The embodiment just described is therefore illustrative and not restrictive, since the scope of the invention is defined by the appended claims rather than by the description preceding them, and all changes that fall within the metes and bounds of the claims, or that form their functional as well as conjointly co-operative equivalents, are therefore intended to be embraced by those claims.

I claim:

1. An electric arc welding torch which comprises: a torch body assembly for positioning a welding electrode relative to work to be welded and for transmitting electrical current to said electrode, said torch body assembly comprising a lateral support member between the ends thereof with a face having an electrically conductive portion and coolant delivery and discharge openings, means for conducting electric current from said portion to said electrode, cooling jacket means at the arc end region of said torch body assembly and coolant delivery and discharge conduit means between said openings in said lateral support member and said cooling jacket means; means for holding said torch body assembly and for supplying service thereto, said means comprising a lateral mounting member with a face abutting said face of said lateral support member, said face having a corresponding aligned, electrically conductive, portion and coolant delivery and discharge openings, means for conducting electric current from a cable to said portion, and coolant delivery and discharge conduit means between said openings and coolant inlet and outlet means; and means for attaching said lateral support member to said lateral mounting member, said last-named means including holding means connecting said support member and said mounting member for lateral linear assembly and disassembly.

2. A torch body assembly for an electric arc welding torch for positioning a welding electrode relative to work to be welded and for transmitting electrical current to said electrode, said torch body assembly comprising: a lateral support member between the ends thereof with a face having an electrically conductive portion, a shield gas opening and coolant delivery and discharge openings; means for conducting electric current from said portion to said electrode; means for forming a gas shield about said electrode at the arc end region of said body; means for adjusting the position of the point of entry of said current into said electrode with respect to said gas shield; shield gas conduit means from said shield forming means to said shield gas opening in said face; coolant jacket means about said torch body in the arc end region thereof; and coolant delivery and discharge conduit means from said coolant jacket to said coolant delivery and discharge openings.

3. An electric arc welding torch body assembly for positioning a welding electrode relative to work to be welded and for transmitting electrical current to said electrode, which comprises: a relatively fixed outer member; a relatively movable inner member concentric with said outer member and forming electrical contact therewith over a substantial portion of its surface; shoe means laterally movable in said inner member for contacting a longitudinal portion of one side of said electrode in the arc end region of said body; support means in said inner member opposite said shoe means for supporting said longitudinal portion on the opposite side of said electrode, at least one of said shoe means and support means being electrically conductive; spring means urging said shoe means toward said support means; and means for conducting electric welding current from said inner member to that of said shoe means and support means, which is electrically conductive.

4. An electric arc welding torch body assembly for positioning a welding electrode relative to work to be welded and for transmitting electrical current to said electrode, which comprises: an inner, electrically conductive, barrel member having from one end to the other a longitudinal, coaxial, electrode passageway and having in the arc end region thereof a longitudinal slot extending from a side of said inner barrel member to at least the axis of said passageway; laterally movable, electrically conductive shoe means in said slot for contacting an electrode in said passageway; spring means urging said shoe means towards said axis; means for conducting electrical current to said inner barrel member, said means comprising a relatively stationary, outer barrel member of electrically conductive material in sliding fit with said inner barrel member; rotatable adjustment cylinder means in threaded engagement with the end of the inner barrel member opposite the arc end thereof, said adjustment cylinder means comprising collar means with one side adjacent said end of said outer barrel member; and bushing means adjacent the other side of said collar means and fastened to said outer barrel member.

5. An electric arc welding torch body assembly for positioning a welding electrode relative to work to be welded and for transmitting electrical current to said electrode, which comprises: an electrically conductive, inner barrel member having from one end to the other a longitudinal, coaxial, electrode passageway and having in the arc end region thereof a longitudinal slot extending from a side of said inner barrel member to at least the axis of said passageway; laterally movable shoe means in said slot for contacting an electrode in said passageway; spring means urging said shoe means towards said axis; means for conducting electrical current to said inner barrel member, said means comprising an electrically conductive, relatively stationary, outer barrel member surrounding said inner barrel member and in sliding fit therewith, said outer barrel member comprising between the ends thereof a lateral support member of electrically conductive material having a face for abutting contact with a matching, electrically conductive, face of a lateral mounting member of a service and holding means; rotatable adjustment cylinder means in threaded engagement with the end of the inner barrel member opposite the arc end thereof, said adjustment cylinder means comprising collar means with one side adjacent said end of said outer barrel member; and bushing means adjacent the other side of said collar means and fastened to said outer barrel member.

6. An electric arc welding torch assembly for positioning a welding electrode relative to work to be welded and for transmitting electrical current to said electrode which comprises: an electrically conductive, inner barrel member having from one end to the other a longitudinal, coaxial, electrode passageway, in the arc end region thereof a longitudinal slot extending from one side of said inner barrel member through said passageway to adjacent the other side of said inner barrel member and between said longitudinal slot and the arc end thereof a transverse hole from one side of said inner barrel member through said passageway to adjacent the other side of said inner barrel member; electrically conductive, first shoe means in said slot between said other side of said inner barrel member and the axis of said passageway for contacting an electrode in said passageway; electrically conductive, laterally movable second shoe means in said slot adjacent said first shoe means for contacting an electrode in said passageway; spring means urging said second, laterally movable, shoe means inwardly towards said first shoe means; a removable, electrically non-conductive, arc extinguishing insert seated in said transverse hole, said insert having an electrode passageway therethrough with a diameter slightly greater than that of said electrode; means for conducting electrical current to said inner barrel member, said means comprising an outer barrel member of electrically conductive material in sliding fit with said inner barrel member; rotatable adjustment cylinder means in threaded engagement with the end of the inner barrel member opposite the arc end thereof, said adjustment cylinder means comprising collar means with one side adjacent said end of said outer barrel member; and bushing means adjacent the other side of said collar means and fastened to said outer barrel member.

7. An electric arc welding torch assembly for positioning a welding electrode relative to work to be welded and for transmitting electrical current to said electrode which comprises: an electrically conductive, inner barrel member having from one end to the other a longitudinal, coaxial, electrode passageway, in the arc end region thereof a longitudinal slot extending from one side of said inner barrel member through said passageway to adjacent the other side of said inner barrel member; electrically conductive, first shoe means in said slot between said other side of said inner barrel member and the axis of said passageway for contacting an electrode in said passageway; electrically conductive, laterally movable second shoe means in said slot adjacent said first shoe means for contacting an electrode in said passageway; spring means urging said second, laterally movable, shoe means inwardly towards said first shoe means; a tubular, coaxially aligned, electrically non-conductive, arc extinguishing member at the arc end of said inner barrel member; means for mounting said arc extinguishing member to said inner barrel member; means for conducting electrical current to said inner barrel member, said means comprising an outer barrel member of electrically conductive material in sliding fit with said inner barrel member; rotatable adjustment cylinder means in threaded engagement with the end of the inner barrel member opposite the arc end thereof, said adjustment cylinder means comprising collar means with one side adjacent said end of said outer barrel member; and bushing means adjacent the other side of said collar means and fastened to said outer barrel member.

8. An electric arc welding torch assembly for positioning a welding electrode relative to work to be welded and for transmitting electrical current to said electrode, which comprises: an electrically conductive, inner barrel member having from one end to the other a longitudinal, coaxial, electrode passageway; electrical current transmission means in the arc end region thereof for contacting said electrode; means for conducting electrical current to said inner barrel member, said means comprising an outer barrel member of electrically conductive material in sliding fit with said inner barrel member; rotatable adjustment cylinder means in threaded engagement with the end of the inner barrel member opposite the arc end thereof, said adjustment cylinder means comprising collar means with one side adjacent said end of said outer barrel member; and bushing means adjacent the other side of said collar means and fastened to said outer barrel member.

9. An electric arc welding torch body assembly for positioning a welding electrode relative to work to be welded, for transmitting electric current to said electrode and for forming a gas shield around said electrode between said torch body assembly and said work, which comprises: an electrically conductive, outer barrel member having coaxial means therein for positioning said electrode and for electrically contacting said electrode, the outside of said inner barrel member at the arc end region thereof comprising first, second and third annular recesses, the annular wall between said first and second recesses having a plurality of longitudinal slots whereby said first and second recesses are in communication, the annular wall between said second and third recesses having an outside diameter less than the outside diameter of said annular wall between said first and second recesses, a plurality of longitudinally extending, radial fins between said third recess and said arc end of said outer barrel, said fins being arranged around the circumference of said outer barrel member and providing a plurality of longitudinal gas discharge passageways; shield gas delivery conduit means to said first annular recess; and a casing member surrounding said outer barrel member at the arc end region thereof and covering said radial fins, said casing having an inside diameter in the arc end region thereof substantially that of said outside diameter of said annular wall between said first and second annular recesses of said outer barrel member whereby between said casing and said annular wall between said second and third recesses an annular, shield gas discharge orifice is formed, and said casing member having at the arc end thereof a gas cup means.

10. A universal electric arc welding torch comprising an outer member having means thereon for fastening said outer member to a fixed support, an inner member concentric with said outer member and longitudinally movable with respect to said outer member, passage means formed in said inner member for receiving an electrode for longitudinal movement therethrough, contact means longitudinally fixed with respect to said inner member for transferring electric current from said inner member to said electrode; a removable shield gas nozzle fixedly located with respect to said outer member; and means for axially moving said inner member.

11. A universal electric arc welding torch comprising an electrically conductive outer member having means thereon for releasably fastening said outer member to a fixed support in intimate electrical contact therewith, an inner member concentric with said outer member and longitudinally movable with respect to said outer member, said inner member being in electrical contact with said outer member over a substantial portion of its surface, passage means formed in said inner member for receiving an electrode for longitudinal movement therethrough; contact means longitudinally fixed with respect to said inner member for transferring electric current from said inner member to said electrode; a removable shield gas nozzle fixedly located with respect to said outer member; a cooling jacket fixedly located with respect to said outer member adjacent said gas nozzle; and means for longitudinally moving said inner member.

12. The torch of claim 11, in which said outer member fastening means comprise a pair of abuttable electrically conductive faces, means for releasably holding said faces in abutting relationship, and a plurality of conduit means terminating at corresponding points in said faces for transferring coolant and shield gas from said support to said outer member through said faces.

13. A universal electric welding torch comprising a housing member terminating in a shield gas nozzle; an electrode-receiving member concentric with said shield gas nozzle and axially movable with respect thereto; means axially fixed with respect to said electrode-receiving member to transfer electric current from said electrode-receiving member to said electrode; and means for axially moving said electrode-receiving member.

14. In an electric welding torch having means for producing a gas shield around the electrode tip, the improvement comprising a gas supply path leading into an annular plenum chamber coaxial with said electrode, and a gas exit path from said annular plenum chamber, said exit path comprising a plurality of gas passages parallel to said electrode and having a considerably larger dimension in a direction parallel to said electrode than in any other direction, and the total cross-sectional area of said exit path at its narrowest point being less than the cross-sectional area of said gas supply path at its narrowest point, whereby said gas is merged into a uniform shield surrounding said electrode without turbulence.

References Cited in the file of this patent

UNITED STATES PATENTS

| | | |
|---|---|---|
| 2,289,938 | Smith | July 14, 1942 |
| 2,361,896 | Yeadon | Oct. 31, 1944 |
| 2,544,711 | Mikhalapov | Mar. 13, 1951 |
| 2,616,017 | Anderson | Oct. 28, 1952 |
| 2,628,325 | Schaefer | Feb. 10, 1953 |
| 2,636,967 | Bassot | Apr. 28, 1953 |
| 2,659,797 | Anderson | Nov. 17, 1953 |
| 2,683,791 | Ruehlemann | July 13, 1954 |
| 2,754,395 | Scheller | July 10, 1956 |
| 2,827,549 | Carlson | Mar. 18, 1958 |
| 2,836,705 | Cotter | May 27, 1958 |
| 2,951,934 | Engle | Sept. 6, 1960 |